United States Patent [19]

Klaymar

[11] Patent Number: 5,765,967
[45] Date of Patent: Jun. 16, 1998

[54] METHOD AND APPARATUS FOR BACKFILLING PIPELINE TRENCHES

[75] Inventor: Edward J. Klaymar, Indiana, Pa.

[73] Assignee: KNI Incorporated, Homer City, Pa.

[21] Appl. No.: 637,928

[22] Filed: May 1, 1996

[51] Int. Cl.$^6$ ........................................... E02F 5/22
[52] U.S. Cl. ............................. 405/179; 37/142.5
[58] Field of Search ............................ 405/154, 155, 405/157, 159, 174, 179, 180, 181; 37/142.5

[56] References Cited

U.S. PATENT DOCUMENTS

| | | | |
|---|---|---|---|
| 2,007,969 | 7/1935 | Grodsky | 405/157 |
| 3,282,057 | 11/1966 | Prosser | 405/157 |
| 3,618,329 | 11/1971 | Hanson | 405/179 |
| 3,675,432 | 7/1972 | Keene | 405/157 |
| 4,289,424 | 9/1981 | Shefbuch et al. | 405/179 |
| 4,664,791 | 5/1987 | McClain et al. | 37/142.5 |
| 4,666,337 | 5/1987 | Pinto | 405/179 X |
| 4,955,756 | 9/1990 | Klamar | 405/179 |
| 5,082,397 | 1/1992 | Raviv | 405/179 X |
| 5,176,025 | 1/1993 | Butts | 73/40.5 |
| 5,360,294 | 11/1994 | Carriker et al. | 405/270 |
| 5,374,139 | 12/1994 | Kugler | 405/129 |
| 5,423,629 | 6/1995 | Zimmerman | 405/129 |

FOREIGN PATENT DOCUMENTS

| | | | |
|---|---|---|---|
| 2232211 | 12/1974 | France | 405/180 |
| 06280284 | 10/1994 | Japan | 37/142.5 |
| 2158489 | 11/1985 | United Kingdom | 37/142.5 |

OTHER PUBLICATIONS

Brochure entitled "Reinforcer High Performance Woven Reinforcement Geotextiles," Synthetic Industries Geosynthetic Products Division, Feb. 1, 1996.
Brochure entitled "Nonwoven Geotextiles," Synthetic Industries, Oct., 1995.
Brochure entitled "Smart Solutions in Synthetics," Synthetic Industries, Feb., 1995.
Advertisement entitled "Pipe Saver Rockshield," Conwed Plastics, undated, received Apr. 9, 1996.
Article entitled "Geotextile Swamp Weights: A New Method of Pipeline Buoyancy Control," by R. G. Marshall and M. Rizkalla, Pipeline Digest, Nov., 1991, pp. 11–13.

*Primary Examiner*—Tamara L. Graysay
*Assistant Examiner*—Frederick L. Lagman
*Attorney, Agent, or Firm*—Buchanan Ingersoll, P.C.

[57] ABSTRACT

In a method for backfilling pipe placed in a ditch and surrounded by a padding material a geotextile material is placed over the padding material and then spoil is backfilled into the ditch. The geotextile material prevents rocks and other large particles from encroaching upon the padding material which surround the pipe and then scratching the pipe. Preferably, the spoil is separated into layers of increasingly larger diameter particles. The geotextile material can be carried on a padding machine or a frame attached to a tractor or other vehicle. A spreader and optionally a leveler are also provided to evenly place the geotextile material in the ditch.

17 Claims, 6 Drawing Sheets

METHOD AND APPARATUS FOR BACKFILLING PIPELINE TRENCHES

BACKGROUND OF THE INVENTION

1. Field of the Invention

The present invention relates to a method and apparatus to stabilize the backfill of ditches having a pipeline therein to prevent rocks or other larger particles from encroaching upon the padding material which surrounds the pipe.

2. Description of the Prior Art

Steel pipelines are used for transporting fluids, such as gas or oil, over a long distance, and it is common practice to bury the pipelines underground. Typically, top soil is stripped away and reserved for reapplication after the trench is backfilled. The a trench is dug to a depth which allows 3 feet of cover over the pipe and 6 inches of space under the pipe. Subsoil removed from the trench is piled near the trench for later use as backfill material.

The pipe is laid on supports which hold the pipe generally six (6) inches above the trench floor. These supports can be sand bag piles or foam blocks spaced every 12 feet or so, or on a continuous bed of rock free soil. The pipe is then covered with rock free dirt called padding so that the padding material surrounds the pipe a minimum of 6 inches under, over and beside the pipe. Typically, the padding material is sand or subsoil with a particle size having a diameter not larger than 1½ inches. Some specifications call for a maximum diameter of 1 inch or ½ inch. The industry term for this construction step is "Pipeline Padding."

In fairly low rock content areas pipeline padding can be accomplished with a backhoe operator virtually selecting dirt without rocks and gradually pulling it into the trench. In more rocky areas sand or screened dirt must be purchased and hauled to the right-of-way or produced on-site by pipeline padding machines. Padding machines are specifically designed portable screening machines which process the excavated spoil or right-of-way subsoil to produce and place padding material over the newly laid pipe. After the padding has been applied the remaining rock and subsoil spoil is then reintroduced into the trench.

Figure 1:
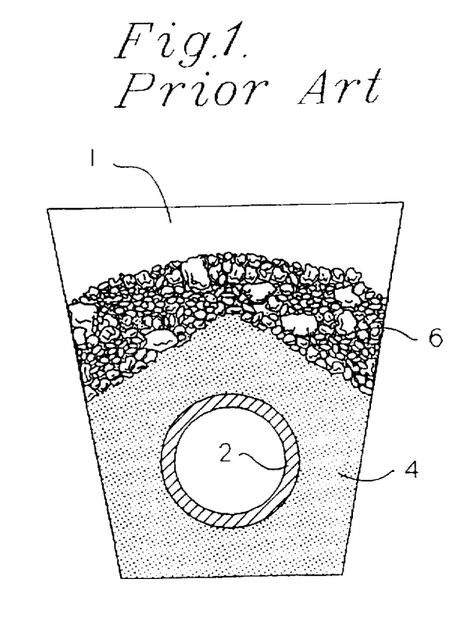
FIG. 1 is a cross-sectional view of a trench containing a pipeline backfilled according to one prior art method.

FIG. 1 shows a cross-section of a trench 1 backfilled according to one prior method. The pipeline 2 is surrounded by padding material 4. Typically this padding material will have been screened from soil dug from the trench. The remaining soil 6 is deposited over the padding material to completely backfill the trench.

Figure 2:
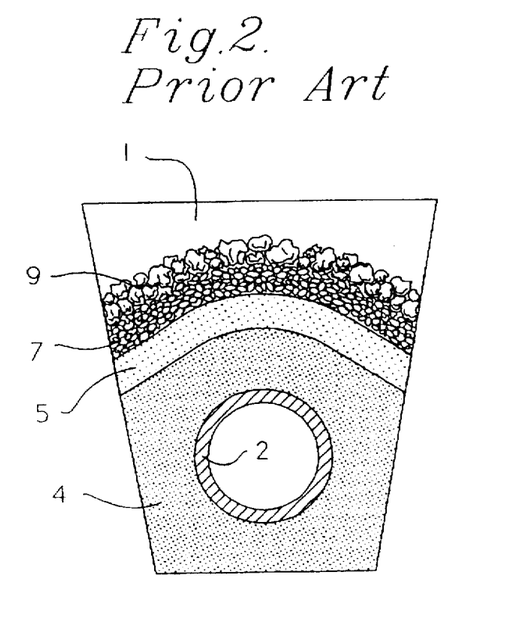
FIG. 2 is a cross-sectional view of a trench containing a pipeline backfilled in accordance with a second prior art method.

A second prior art backfill method is illustrated by the trench cross-section of FIG. 2. In this method the soil removed from the trench is run through multiple screens. The final screening creates the padding material 4 which typically contains subsoil having particles sized up to ⅝ inches nominal in diameter. Intermediate screenings provide intermediate layers 5, 7 and 9. Layer 5 contains ⅝" to 1½" stone. Layer 7 contains 1½" to 5" stone. Layer 9 contains 5" plus rocks produced by the multiple screened device and the remaining rock and subsoil spoil backfilled into the trench. Layers 5 and 7 form a non-compactable barrier between the padding material 4 and the larger rock and subsoil mixture 9. In many areas a layer of topsoil 11 is placed over the backfill to completely fill the trench.

The screening and backfilling of soil into the trench is often done by pipeline padding machines. This backfilling device usually includes a storage hopper or similar compartment for receiving the backfill material, a continuous conveyor and a system of vibrating screens for sorting the backfill material. The components within the backfilling device are supported by a mainframe which is carried above the ditch to be backfilled. A support arm rigidly locks the backfilling device with a tractor or other means of locomotion. The backfilling device is configured to backfill the ditch with various layers of different sized backfill material in a single pass. One such backfilling device is described in U.S. Pat. No. 4,955,756, but numerous other alternatives exist within the market.

The major problem facing owners and users of underground pipelines is corrosion. Corrosion is an electrochemical process, requiring an anode and a cathode electrically connected in an electrolyte. Corrosion is a self-poisoning process, and in order for it to continue over a long period of time, a mechanical or chemical means for depolarization or depassivation must exist. Interference with any one of these requirements will reduce the corrosion rate.

A widely used method of protecting pipes is the use of coating materials including tape, plastic, enamel, epoxy and urethane paint. The coatings separate the anode and cathode or isolate the electrolyte from the metal as long as the coating is free of defects.

In addition to the coatings it is known practice to use cathodic protection for the protection of metals buried underground. Present pipeline designs frequently include cathodic protection in accordance with the known technology which is effected by connecting the surface of the steel pipe either to a buried sacrificial anode or to an impressed current source. Cathodic protection is useful in preventing localized erosion of scratched and chipped pipe. However, cathodic protection is unable to protect from corrosion caused by water migration under the protective coating where the protective coating acts as an insulator. If the coating separates from the pipe, water may migrate under the coating and set up a corrosion cell using the coating as a shield against the cathodic protection. Furthermore, cathodic protection is expensive and typically is performed throughout the useful life of the pipeline.

Pipeline owners have developed techniques to observe underground pipelines in use. Some methods enable pipeline owners to see changes in pipeline wall thickness caused by localized corrosion. If the pipe is sufficiently corroded so that the wall thickness becomes too thin, the pipeline must be replaced. Because replacement of underground pipelines is expensive, pipeline owners have continued to search for better ways to prevent corrosion. Most of this effort has been directed to developing improved alloys, coatings and cathodic protection systems. Little attention has been paid to preventing damage to coatings during pipeline installations. Prior to the present invention the art has ignored the chipping and scratching of pipeline coatings which occurs after installation.

Obviously scratching and chipping of the pipeline can occur during pipeline handling on installation. A second less obvious method of scratching and chipping involves migration of rocks into the padding layer.

Rocks can and do break into the padding and damage the pipe coating during backfill using the method which results in the backfilled trench of FIG. 1. After construction the padding layer provides only minimal support for point loads allowing rocks to move down into the padding layer and reach the pipe. This movement can occur during periods when standing water accumulates in the bottom of the trench. The water can mix with the padding material to an extent where the padding layer completely loses its ability to support the overhead rocks. In this condition the padding material and the overhead rocks change positions and the pipe becomes surrounded by rocks. Further movement of the rocks against the pipe chips or cracks the protective coatings resulting in corrosion. Thus, there is a need for a backfill method which creates a backfill trench in which rocks are prevented from entering the padding layer. Preferably this method can be practiced using existing pipeline padding machines as well as in less rocky areas where padding can be accomplished by selective backfill.

Rocks can not break into the padding layer 4 during backfill using the method which results in the backfilled trench of FIG. 2. Layers 5 and 7, which form a non-compactable barrier of sized stone prohibit point loads from acting on the top surface of the padding layer 4. After construction, however, excess water in the backfilled trench will allow the padding material 4 and the non-compactable layers 5 and 7 to gradually mix until at some point rocks could enter the padding layer 4.

There are a class of materials known as geotextiles which are used primarily in roadway construction for erosion control. These materials allow subsurface water to pass while preventing adjacent soil from migrating past the geotextile layer. Light and medium weight nonwoven geotextiles placed over or around a drainage layer of large stone and rocks allow subsurface water to flow into the drainage core while preventing adjacent soil from clogging the drainage system. Geotextiles are placed over railroad beds to prevent fouling of ballast beneath railway track. Geotextile layers have also been placed around layers of soil to create retaining walls and to allow slopes to be safely steeped. Geotextiles as well as other types of sheet materials such as polyethylene sheets and bentonite clay liners are also used in landfills. The art, however, has failed to recognize that geotextiles could be used in pipeline trenches to prevent rock migration into the padding layer.

In U. S. Pat. No. 5,176,025 Nicholas Butts discloses a pipeline system for preventing detecting and containing leakage from subterranean pipeline transporting hydrocarbon liquids and gases. This system is designed to both prevent corrosion and contain any liquids or gases that leak from the pipeline. In Butts' system steel pipe is wrapped with a geotextile material impregnated with hydrated lime. That wrapper is completely covered by a protective, water impermeable layer of high density polyethylene (HDPE) sheet. Each sheet of HDPE is welded to the adjacent sheet forming a continuous impermeable sleeve around the pipe. Should the sleeve break and water permeate the sleeve the lime impregnated geotextile layer dissolves creating a highly alkaline solution providing the electric potential for cathodic protection. Since water causes the geotextile used by Butts to dissolve that geotextile offers no protection against rock migration resulting from water in the trench.

Geotextiles have also been proposed for use in swamp weights as an alternative to concrete swamp weights for resisting buoyant forces acting on pipelines crossing water inundated terrain or organics. After the pipeline has been lowered into the ditch, a woven geotextile fabric is placed at designed intervals along the ditch. The fabric is draped down one ditch wall, placed across the ditch bottom, over the top of the pipe, and then draped up the other ditch wall. The backfill, consisting of either native ditch spoil material, a mixture of native and imported material, or entirely imported material, is then placed over the pipe in the normal manner. In this system the geotextile does not run the full length of the trench nor does it stabilize the backfill profile to prevent migration of rocks.

Underground pipes have also been wrapped with polyethylene webbing to protect the pipe from rocks and other debris. This material, called rock shield, usually consists of extruded plastic although geotextile fabric is sometimes used. Rock shield is utilized as a second coating layer wrapped around the pipe. In this system the geotextile does not stabilize the backfill to prevent rocks from entering or mixing with the padding material.

SUMMARY OF THE INVENTION

I provide a method and backfilling machine for backfilling a trench containing a pipe in which a geotextile material is placed over or around the padding materials. The geotextile prevents rocks from mixing with the padding material.

In applications where backfill is screened to provide layers of increasingly larger size stones, the geotextiles can be placed on top of the padding layer.

I further provide an improved padding machine which carries a roll of geotextile material and automatically lays that material over the padding material. A spreading arm is preferably provided to keep the fabric flat in the trench while being covered with subsequent layers.

I also provide an apparatus for placing geotextile material over the padding layer which can be used with selective backfill practices or when padding material is imported.

Other objects and advantages of my backfill method and improved padding machine will become apparent from a description of certain present preferred embodiments thereof shown in the drawings.

DESCRIPTION OF THE PREFERRED EMBODIMENTS

Figure 3:
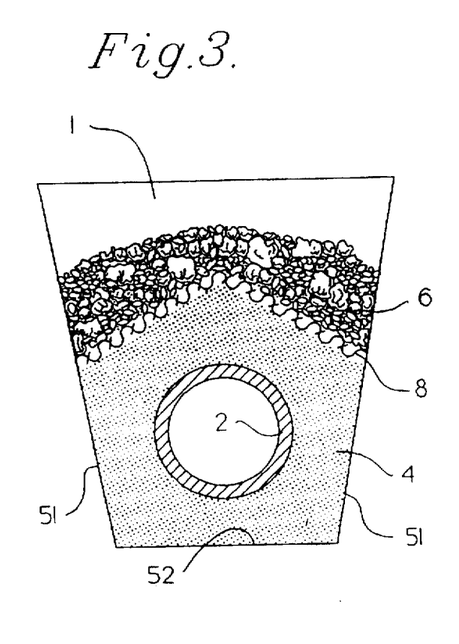
FIG. 3 is a cross-sectional view of a pipeline in a trench which has been backfilled according to a first present preferred embodiment of my backfill method.

The first present preferred embodiment of my method is based upon the prior art practice of FIG. 1. Referring to FIG. 3, a pipeline 2 is placed in a ditch or trench 1 and covered with padding material 4. A geotextile material 8 is placed over the padding material and generally extends from one side of the ditch to the other. I prefer to use woven rather than nonwoven geotextile material. Backfill containing soil 6 is then placed on top of the geotextile material. If desired, top soil (not shown) can be placed over the backfill material to complete the filling of the ditch.

Although geotextile material does not provide excellent load bearing capabilities as it can be torn or ruptured nor does geotextile material have excellent load distribution capabilities it can stabilize the padding material 4 if the backfill spoil 6 contains a low to moderate percentage of larger rocks and provided the backfill spoil 6 is carefully placed on top of the geotextile material 8.

The geotextile material 8 acts as a stabilizing sheet which permits water to pass while preventing the passing of solids, either from the padding material 4 or the backfill spoil 6, provided that the geotextile material 8 is not torn or ruptured. There may be other nondegradable fabrics not generally considered to be geotextiles which could be used as this stabilizing sheet. Consequently, the padding material 4 will maintain its integrity and not be encroached by rocks and there will be no scratching of the pipe after the backfill process has been completed.

Figure 4:
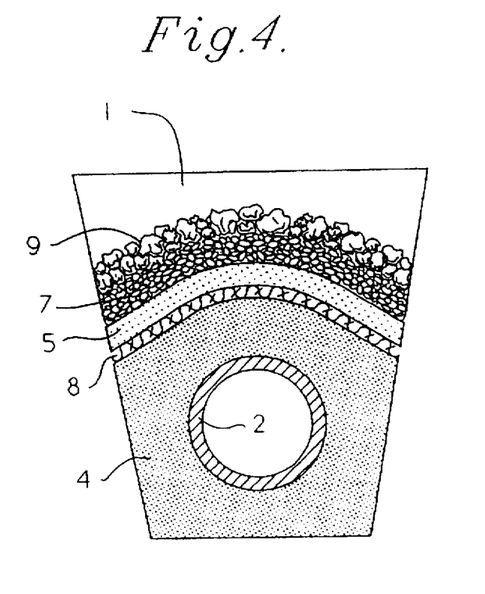
FIG. 4 is a cross-sectional view of a trench containing a pipeline backfilled according to a second preferred embodiment of my backfill method.
Figure 5:
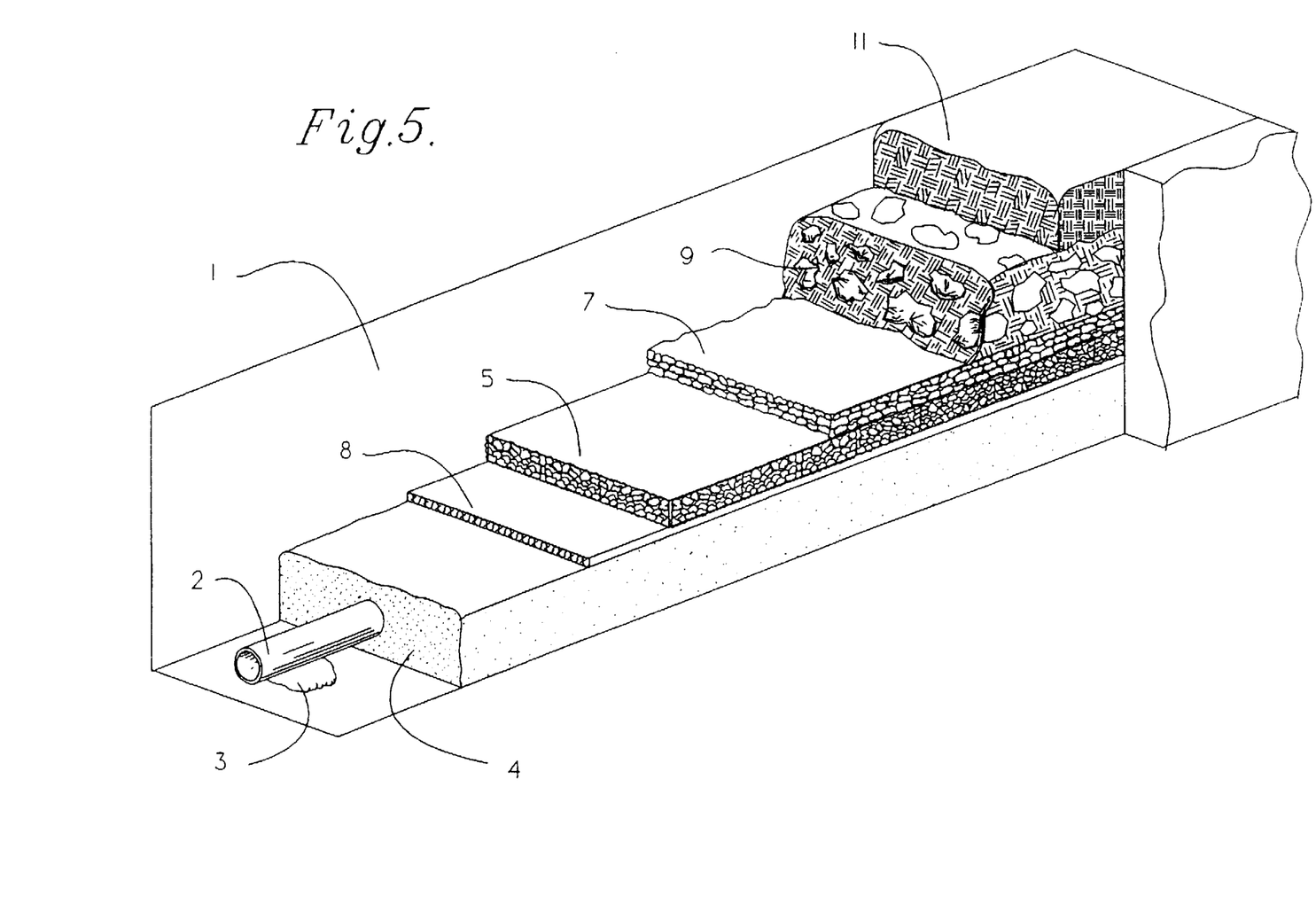
FIG. 5 is perspective view of a trench containing a pipeline backfilled in accordance with the second preferred backfill method.

A second preferred embodiment of my method is illustrated in FIGS. 4 and 5. As in the prior art process of FIG. 2, a pipe 2 is placed in trench 1 and covered with padding material. The padding material has been created by running the spoil removed from the trench through a series of screens. The material passing through the finest screen is the padding material. Preferably, the padding material will contain particles having a diameter of up to $5/8$ nominal inches. Next, I place a layer of geotextile fabric 8 on top of the padding layer. Then, I place a layer of stone ranging between $5/8$ and $1½$ inches in diameter on top of the geotextile material to form layer 5. On top of layer 5 is placed a layer 7 containing stone having diameters from $1½$ inches to 5 inches. Finally, layer 7 which contains rock having a diameter greater than 5 inches mixed with smaller stone and soil is placed. Preferably, an automated padding machine is used to separate the soil removed from the trench into the various layers 4, 5, 7 and 9. In most installations a layer of top soil 11 will be placed on top of the coarse backfill layer 9. When the pipe is initially placed in the trench it is supported by sandbags 3 or other supports. The sandbags maintain the pipe 2 at some distance above the trench floor to allow padding material to be placed under the pipe. In the installation shown in FIGS. 4 and 5, layers 5 and 7 form a non-compactable barrier between padding and the rock and soil backfill layer 9. This barrier distributes loads over the top surface of the padding material. The geotextile fabric 8 prevents mixing of the padding material 4 below and the sized stone 5 above. Consequently, the integrity of both the non-compactable barrier and the padding layer 4 is maintained and rock damage to the pipe is prevented.

Figure 6:
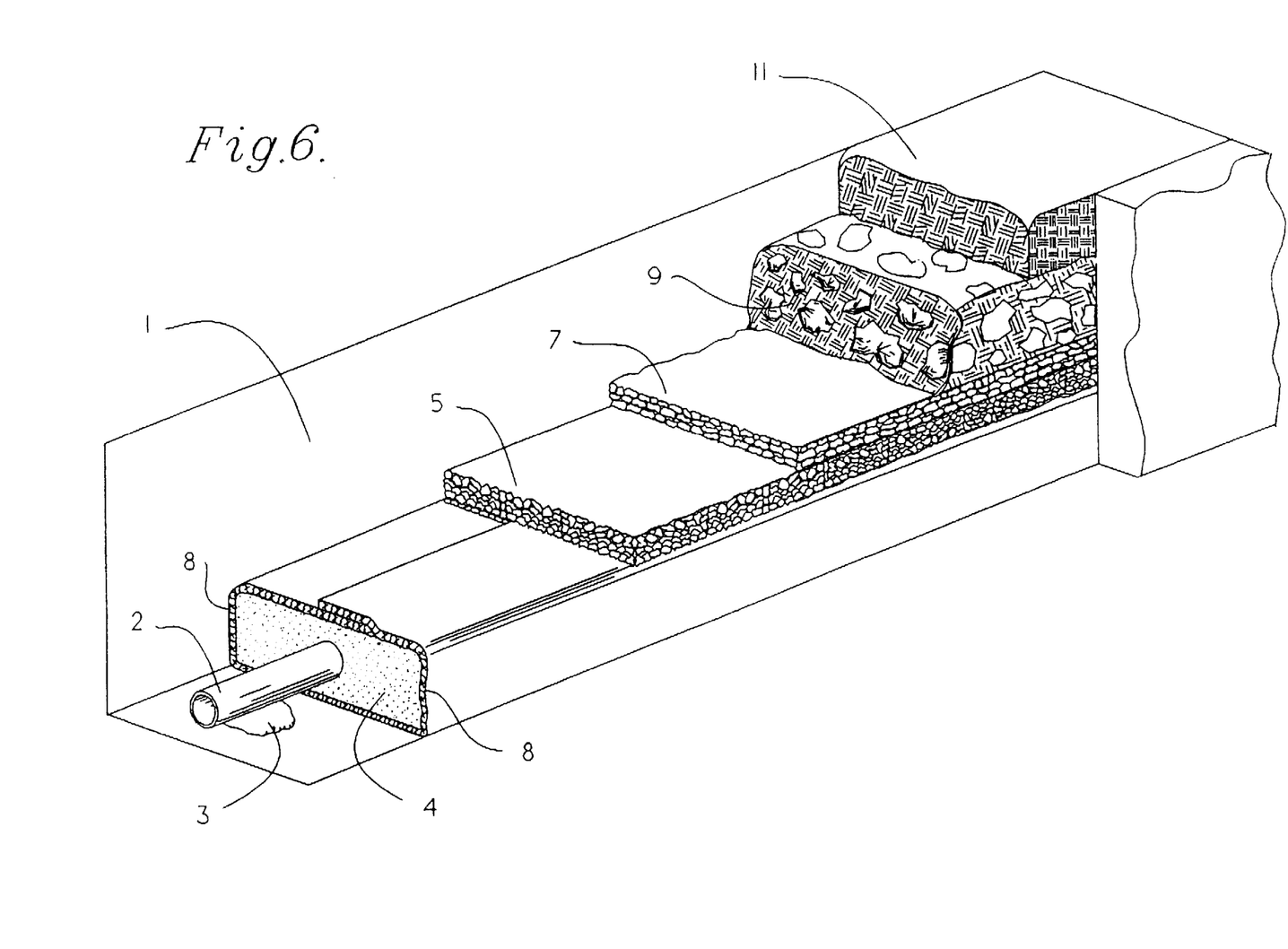
FIG. 6 is a perspective view similar to FIG. 5 illustrating a pipe backfilled in accordance with a third present preferred backfill method.

A third present preferred embodiment of my backfill method is shown in FIG. 6. In this embodiment geotextile material 8 is draped down one side of the trench across the bottom and up the opposite side of the trench. Then, the pipe 2 is placed on sandbags 3 in the trench. Padding material 4 is deposited around the pipe. Then that portion of the geotextile fabric 8 extending above the trench is folded over the top of the padding layer 4 as shown. Then, backfill layers 5, 7, 9 and top soil 11 are placed on top of the geotextile fabric. These layers are placed in the same manner as described before in the embodiments of FIGS. 4 and 5. This embodiment of my backfill method is intended to be used where the trench has been excavated in very unstable subsoil where rocks can break away from the unexcavated trench walls 51 or work upward from the unexcavated trench bottom 52.

Figure 7:
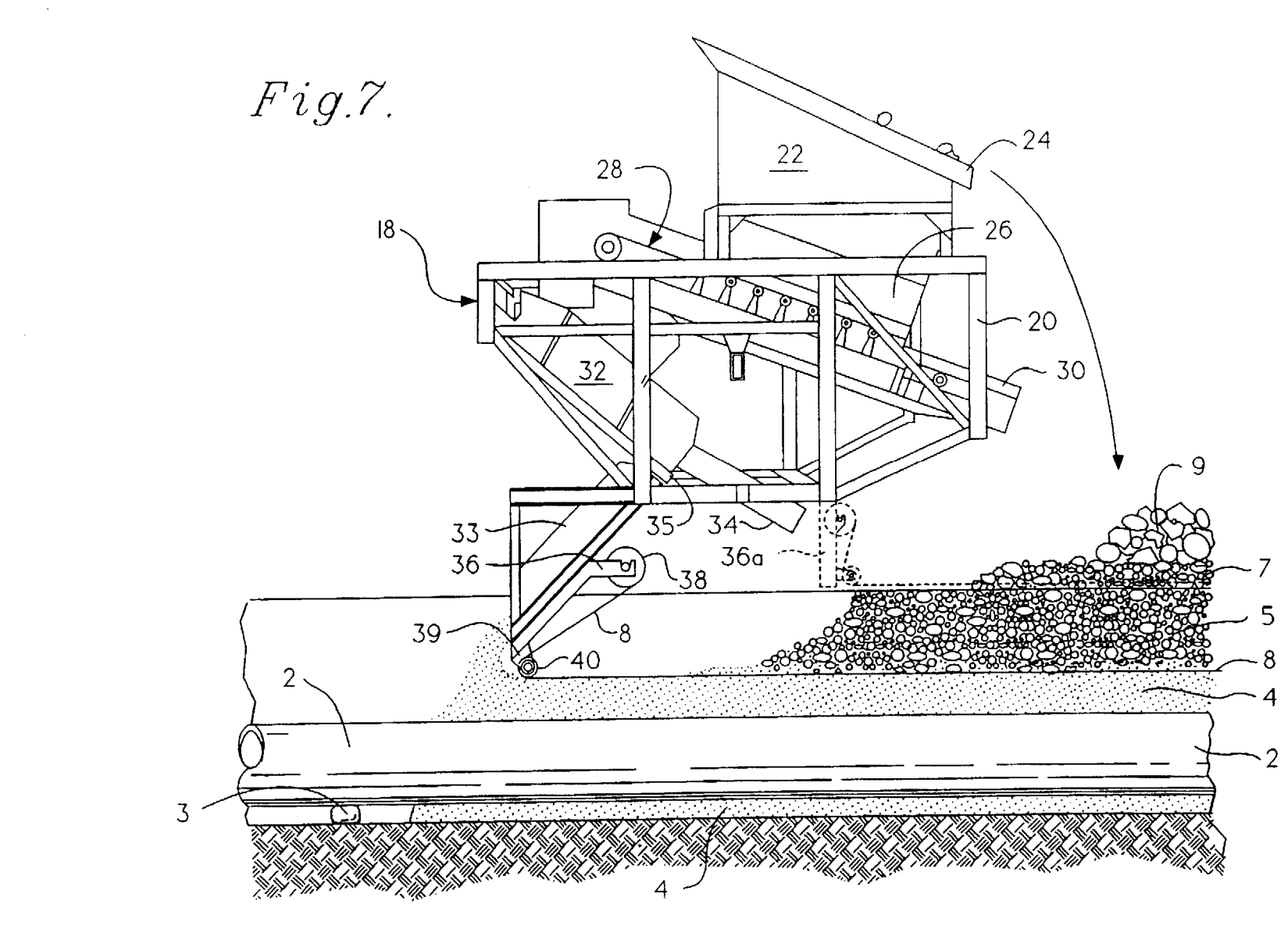
FIG. 7 is a side view of a present preferred embodiment of my improved padding machine.
Figure 8:
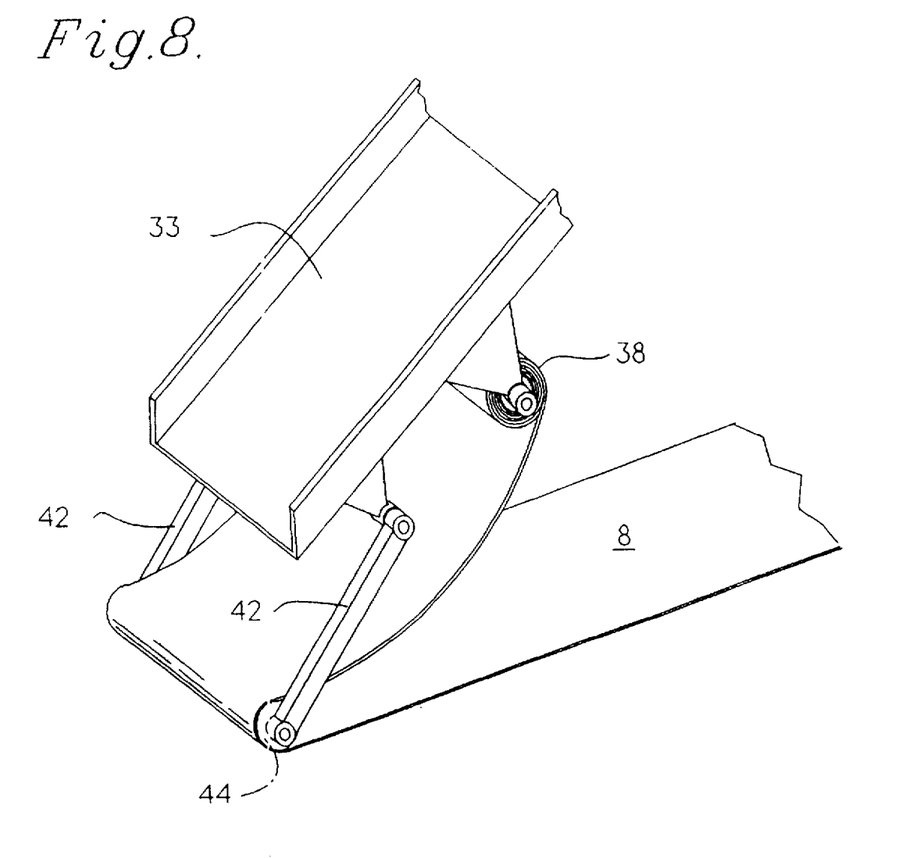
FIG. 8 is a perspective view of a portion of a padding machine illustrating a second preferred embodiment of my improved padding machine.

The methods illustrated in FIGS. 4 thru 6 can be practiced using the padding machine shown in FIGS. 7 and 8. Referring to FIG. 7, the padding machine 18 has a frame 20. A hopper 22 having a grizzly 24 is placed on top of the frame. A large screen 26 is placed at the bottom of hopper 22. When backfill material is placed on top of the grizzly large rocks will fall off forming layer 9. Other material will pass through screen 26 onto conveyor 28. Material having diameter between $1½$ and 5 inches will fall from the back of screen 26 onto chute 30. That material will drop to form layer 7. Material passing through screen 6 will fall onto conveyor 28. That conveyor moves the material onto screen 32. Stones having a diameter between $5/8$ inches and $1½$ inches will not pass through screen 32. Rather, they will fall onto chute 34 and then down to form layer 5. The fine material having a diameter of $5/8$ inches or less drops through screen 32 onto chute 33 and into the trench to form the padding material 4.

In the improved padding machine I provide a support 36 on which I place a roll 38 of geotextile material 8. Geotextile material is routed around roller 40 held by bracket 39 and the laid on top of the padding layer 4. Roller 40 also levels the padding layer during placement of the geotextile fabric. Although I prefer to place the geotextile fabric on the padding layer, I have shown an optional support 36a. Using this support the geotextile fabric is placed between layers 5 and 7 as shown in chainline.

In FIG. 8 I show an alternative configuration of the padding machine wherein the roll 38 of geotextile fabric 8 is mounted directly on the padding machine frame. A pair of leveling arms 42 having a roller 44 between them extends from chute 33. This arrangement maintains the geotextile fabric on the padding layer as the remaining layers 5, 7 and 9 are deposited.

Figure 9:
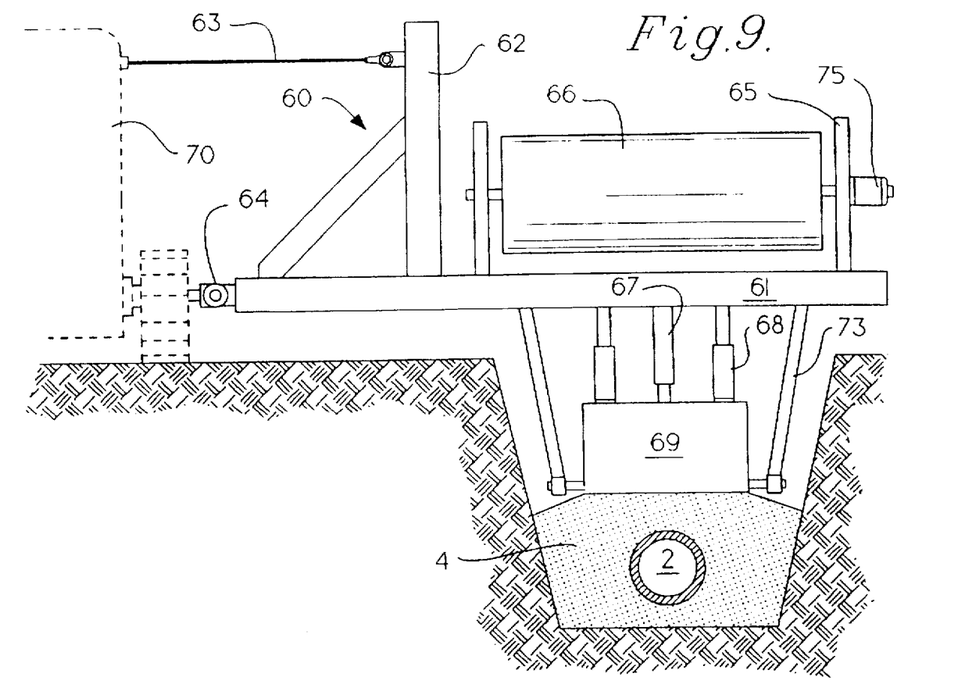
FIG. 9 is an end view of an apparatus for applying geotextile material over the padding material which can be carried by a tractor or other mobile carrier.
Figure 10:
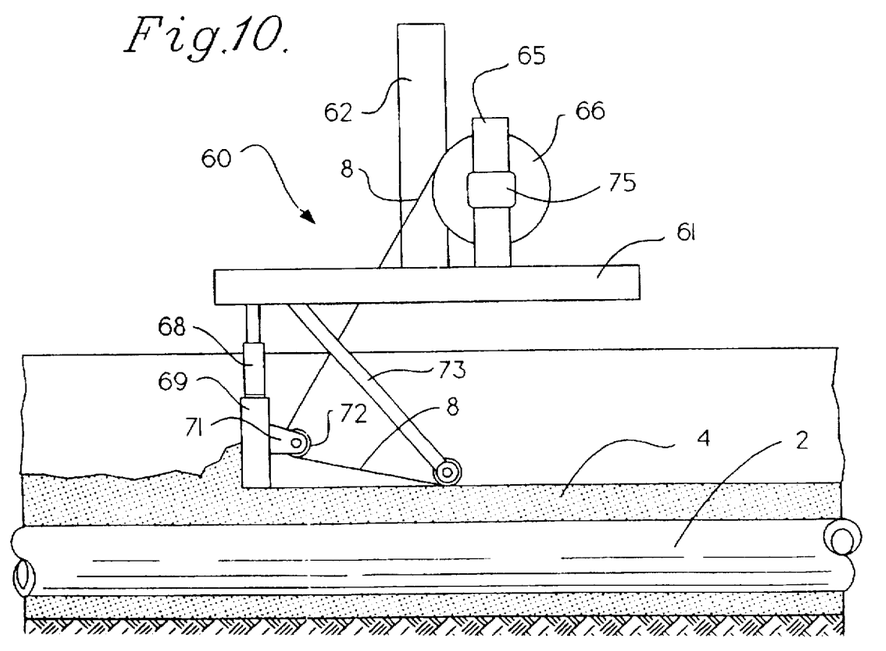
FIG. 10 is a side view of the apparatus shown in FIG. 9.

When selective backfilling is done or padding material is imported the geotextile material may be placed in the trench using the apparatus 60 shown in FIGS. 9 and 10. A rectangular support frame 61 has a mast 62. A cable 63 and clevis 64 are provided to attach the frame 61 to a tractor or other mobile carrier indicated by chainline 70. A roll of geotextile material 66 is carried on rack 65 attached to the top of the frame. I prefer to provide a motor 75 for unrolling the roll of geotextile material. I prefer to provide a padding leveler 69 which is connected to the bottom of the frame by telescoping steel tubing 68. A hydraulic cylinder 67 is provided to adjust the height of the leveler 69. I prefer to provide brackets 71 on the rear of the leveler 69 which holds roller 72. A spreader 73 preferably having a pair of arms with a roller connected between the arms such as is used in the embodiment of FIG. 8 extends from the bottom of the frame 61. Geotextile material is fed from roll 66 over roller 72 and spreader 73 onto padding material 4. The leveler 69 assures that at least a portion of the padding material will be at the same level as the spreader to enable even placement of the geotextile material.

Although I have shown certain present preferred embodiments of my method and padding machine, it should be distinctly understood that the invention is not limited thereto, but may be variously embodied within the scope of the following claims.

I claim:

1. A method of filling a trench after a transmission pipeline has been placed in the trench comprising:
   a. depositing a padding material around the pipe, the padding material comprised of subsoil containing stones having a diameter of not more than $1½$ inches and filling only a portion of the trench;

b. applying over the padding material a geotextile material which permits water to pass while preventing passage of solids; and c. applying spoil over the geotextile material to backfill the trench.

2. The method of claim 1, wherein the step of applying spoil is comprised of the steps of:

a. separating the spoil by particle size into two portions, the first portion containing soil having particle sizes smaller than the second portion;

b. applying the first portion of spoil over the geotextile material; and c. applying the second portion of spoil over the first portion of spoil.

3. The method of claim 2 wherein the first portion of spoil contains particles having a diameter of from 1½ inch to 5 inch.

4. The method of claim 1 wherein the padding material contains particles having a diameter of not more than ⅝ inches and the step of applying spoil is comprised of the steps of:

a. separating the soil by particle size into a first portion containing spoil having particle sizes of from ⅝ inches to 1½ inches, a the second portion containing spoil having particle sizes of from 1½ inches to 5 inches, and a third portion containing spoil having particle sizes greater than 5 inches;

b. applying the first portion of spoil over the geotextile material;

c. applying the second portion of spoil over the first portion of spoil;

d. applying the third portion of spoil over the second portion; and d. applying any remaining rock and subsoil spoil over the third portion.

5. A method of filling a transmission pipeline trench having two sides and a bottom comprising:

a. draping over the sides and bottom of the trench a geotextile material which permits water to pass while preventing passage of solids:

b. placing a transmission pipeline in the trench;

c. depositing a padding material around the pipeline, the padding material comprised of spoil containing stones having a diameter of not more than 1½ inches and filling only a portion of the trench;

d. folding the geotextile material around the padding material; and e. applying spoil over the geotextile material to backfill the trench.

6. The method of claim 5 wherein the step of applying spoil is comprised of the steps of:

a. separating the spoil by particle size into two portions, the first portion containing spoil having particle sizes smaller than the second portion;

b. applying the first portion of spoil over the geotextile material;

c. applying the second portion of spoil over the first portion of soil; and d. applying any remaining rock and subsoil spoil over the second portion as spoil.

7. The method of claim 6 wherein the first portion of spoil contains particles having a diameter of from 1½ inch to 5 inch.

8. The method of claim 5 wherein the padding material contains particles having a diameter of not more than ⅝ inches and the step of applying spoil is comprised of the steps of:

a. separating the spoil by particle size into a first portion containing spoil having particle sizes of from ⅝ inches to 1½ inches, a the second portion containing spoil having particle sizes of from 1½ inches to 5 inches, and a third portion containing spoil having particle sizes greater than 5 inches;

b. applying the first portion of spoil over the geotextile material;

c. applying the second portion of spoil over the first portion of soil;

d. applying the third portion of spoil over the second portion; and e. applying any remaining rock and subsoil spoil over the third portion.

9. An improved backfilling device of the type which applies a padding material around a transmission pipeline in a trench and then applies a backfill material over the padding material wherein the improvement comprises a supply of geotextile material which permits water to pass while preventing passage of solids on the backfilling device and a roller extending from the backfilling device wherein geotextile material from the supply is routed around the roller and into the ditch at a selected level above the padding material.

10. The improved backfilling device of claim 9 also comprising a chute extending from the backfilling device and over which the padding material flows from the backfilling device into the trench and at least one arm extending between the chute and the roller.

11. The improved backfilling device of claim 9 also comprising a chute extending from the backfilling device and over which the padding material flows from the backfilling device into the trench and at least one arm extending between the chute and the roller.

12. The improved backfilling device of claim 9 wherein the supply of geotextile material is a roll of geotextile material.

13. An apparatus for placing geotextile material over padding material surrounding a pipeline in a ditch comprising:

a. a frame sized and configured to be attached to a carrier which moves along one side of the ditch holding at least a portion of the frame over the ditch;

b. a supply of geotextile material on the frame which geotextile material permits water to pass while preventing passage of solids; and c. a spreader extending from the frame and under which the geotextile material passes as the geotextile material is placed in the ditch.

14. The apparatus of claim 13 also comprising a leveler extending from a frame.

15. The apparatus of claim 14 wherein the supply of geotextile material is a roll of geotextile material.

16. The apparatus of claim 15 also comprising a motor attached to the frame and connected to the roll of geotextile for unrolling geotextile material from the roll.

17. The apparatus of claim 14 also comprising at least one hydraulic cylinder connected between the frame and the leveler.

* * * * *

UNITED STATES PATENT AND TRADEMARK OFFICE
CERTIFICATE OF CORRECTION

PATENT NO. : 5,765,967
DATED : June 16, 1998
INVENTOR(S) : EDWARD J. KLAYMAR

It is certified that error appears in the above-indentified patent and that said Letters Patent is hereby corrected as shown below:

Column 7, claim 4, line 22, change "soil" to —spoil—.

Column 7, claim 4, line 36, change "d." to —e.—.

Column 8, claim 8, line 14, change "soil" to —spoil—.

Column 8, claim 10, lines 33-34, delete "at least one arm extending between the chute and the roller" and insert —wherein the supply of geotextile material is attached to the chute.—.

Signed and Sealed this

Sixth Day of October, 1998

*Attest:*

BRUCE LEHMAN

*Attesting Officer*   Commissioner of Patents and Trademarks